US010157370B2

(12) United States Patent
Bakos

(10) Patent No.: US 10,157,370 B2
(45) Date of Patent: Dec. 18, 2018

(54) GRAPHICAL USER INTERFACE FOR ADJUSTING ELEMENTS OF A WIZARD FACILITY DISPLAYED ON A USER DEVICE

(71) Applicant: SAP SE, Walldorf (DE)

(72) Inventor: András Bakos, Mannheim (DE)

(73) Assignee: SAP SE, Walldorf (DE)

( * ) Notice: Subject to any disclaimer, the term of this patent is extended or adjusted under 35 U.S.C. 154(b) by 288 days.

(21) Appl. No.: 14/976,224

(22) Filed: Dec. 21, 2015

(65) Prior Publication Data
US 2016/0328092 A1 Nov. 10, 2016

Related U.S. Application Data

(60) Provisional application No. 62/156,669, filed on May 4, 2015.

(51) Int. Cl.
G06F 3/0483 (2013.01)
G06Q 10/10 (2012.01)
G06F 8/34 (2018.01)
G06F 8/38 (2018.01)
G06F 9/451 (2018.01)

(52) U.S. Cl.
CPC ............ G06Q 10/10 (2013.01); G06F 3/0483 (2013.01); G06F 8/34 (2013.01); G06F 8/38 (2013.01); G06F 9/453 (2018.02)

(58) Field of Classification Search
CPC .................... G06F 3/0482; G06F 11/3051
See application file for complete search history.

(56) References Cited

U.S. PATENT DOCUMENTS

| 6,286,137 | B1 * | 9/2001 | Bleizeffer | G06F 9/44505 715/705 |
| 6,392,670 | B1 * | 5/2002 | Takeuchi | G06F 17/30014 707/E17.013 |
| 7,996,239 | B1 * | 8/2011 | Pellican | G06Q 10/10 705/2 |
| 2005/0102631 | A1 * | 5/2005 | Andreas | G06F 9/451 715/772 |
| 2007/0130587 | A1 * | 6/2007 | Seok | H04N 5/44513 725/56 |
| 2008/0040752 | A1 * | 2/2008 | Kawana | H04N 5/44543 725/58 |

(Continued)

Primary Examiner — William L Bashore
Assistant Examiner — Rayeez R Chowdhury
(74) Attorney, Agent, or Firm — Sterne, Kessler, Goldstein & Fox. P.L.L.C.

(57) ABSTRACT

A method and corresponding apparatus provided for automatically re-formatting and adjusting elements of a wizard facility displayed a user device. The elements can be adjusted based on the type of device being used and space available to display the wizard facility. Information related to each step of the wizard facility can be displayed to the user in different display areas. Each displayed area relates to a specific step, i.e., a completed step, the current step, or a future step and includes visual representations, which can allow the user to interact with the displayed information. Additionally, an interactive progress bar can be displayed that visually represents the user's progress of the wizard facility. The method and apparatus can automatically re-format and adjust the visual elements of the progress bar depending on the type of device being used and the available space to display the progress bar.

20 Claims, 8 Drawing Sheets

(56) References Cited

U.S. PATENT DOCUMENTS

| | | | |
|---|---|---|---|
| 2008/0104534 A1* | 5/2008 | Park | G06F 17/30852 715/772 |
| 2008/0122796 A1* | 5/2008 | Jobs | G06F 3/0488 345/173 |
| 2008/0256474 A1* | 10/2008 | Chakra | G06F 3/0481 715/772 |
| 2011/0227843 A1* | 9/2011 | Wang | B60R 25/00 345/173 |
| 2011/0320179 A1* | 12/2011 | Frank | G06Q 10/06 703/6 |
| 2012/0096384 A1* | 4/2012 | Albert | G06Q 10/10 715/772 |
| 2012/0117506 A1* | 5/2012 | Koch | G06F 3/04886 715/773 |
| 2013/0311928 A1* | 11/2013 | Park | G06F 3/04847 715/772 |
| 2014/0380222 A1* | 12/2014 | Smith | G06Q 10/02 715/772 |

* cited by examiner

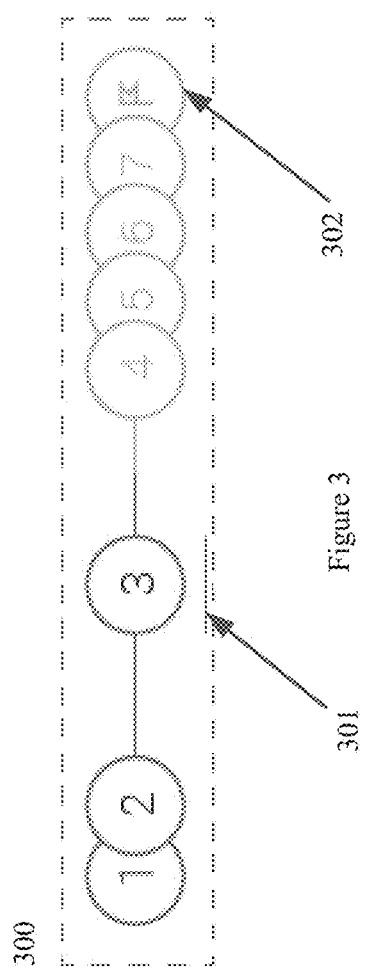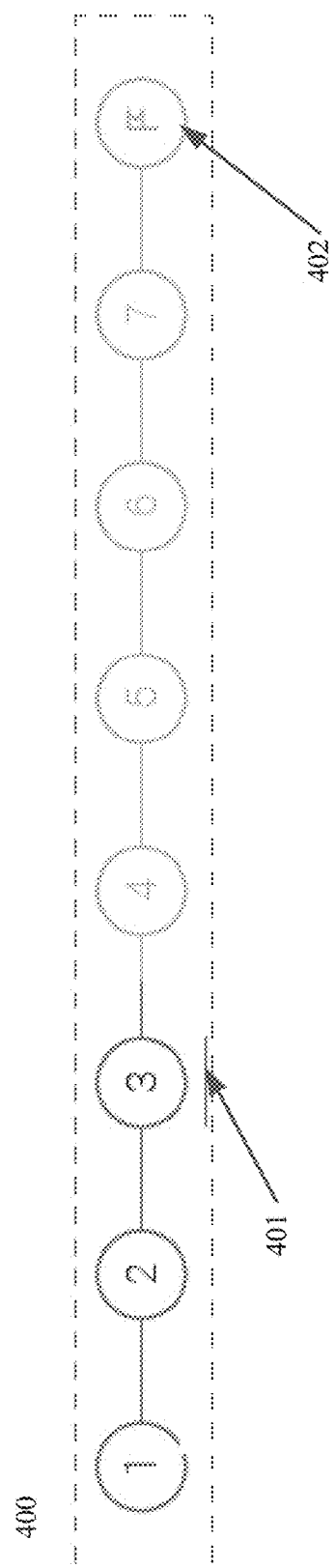
Figure 3
Figure 4

GRAPHICAL USER INTERFACE FOR ADJUSTING ELEMENTS OF A WIZARD FACILITY DISPLAYED ON A USER DEVICE

RELATED APPLICATIONS

This application claims priority to U.S. patent application Ser. No. 62/156,669, filed on May 4, 2015, the content of which is incorporate herein in its entirety.

TECHNICAL FIELD

The present disclosure relates to the field of software user interfaces and, in particular, to wizard facilities within same.

BACKGROUND

Modern computer systems employ various User Interface (UI) mechanisms including inter alia Graphical User Interfaces (GUIs). One commonly utilized GUI facility is the wizard. Wizards are typically employed when a complex, lengthy, etc. task lends itself to being broken down into a series of steps, subtasks, etc. in order to improve the comprehensibility of, reduce the complexity of, reduce possible confusion during, etc. the task. Wizards are typically step-by-step in nature and constrained in operation.

BRIEF DESCRIPTION OF THE DRAWINGS

FIG. 3 depicts aspects of a responsive progress indicator or bar.

FIG. 4 depicts aspects of a responsive progress indicator or bar.

DESCRIPTION OF EXAMPLE EMBODIMENTS

Figure 1:
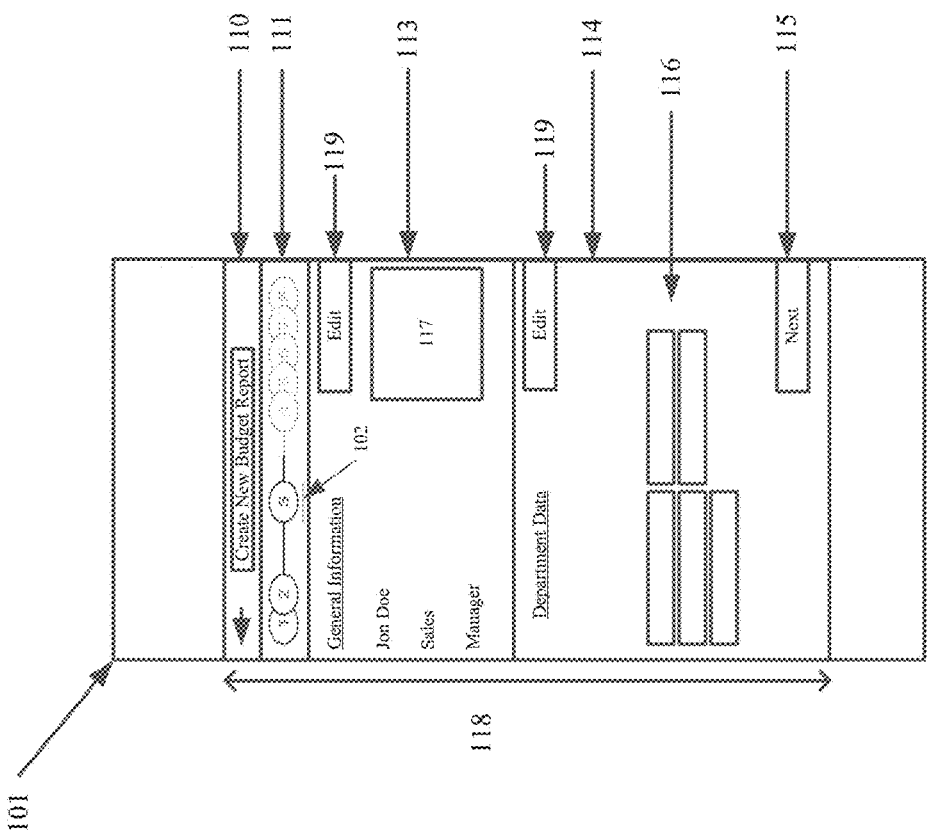
FIG. 1 depicts aspects of a wizard facility as described herein as it might appear on one particular device or platform—a smartphone.

The wizard facility as described herein may support a series of screens, displays, pages, etc. that are associated with a particular task and which may be presented in a particular sequence. Each screen, display, page, etc. may correspond to a step in the overall task. The screens, displays, pages, etc. are often graphical but are not necessarily so. Frequently each screen, display, page, etc. contains a mix of inter alia descriptive (for example textual) information along with any number of display, entry, selection, etc. devices (such as fields, buttons, lists, checkboxes, etc.). An easy to read progress indicator or bar may be provided that depicts possibly among other things the current step, the completed steps, the number of steps that are yet to be completed, etc. to inter alia quickly inform a user and permit a user to quickly and easily traverse, complete, etc. a task. The screens, displays, pages, etc. may be presented in any number of ways (stacked, layered, etc.) for among other things efficient presentation and to easily allow a user to scroll, walk, etc. through same (with for example the progress indicator or bar dynamically changing to reflect, track, etc. such actions).

The wizard facility described herein may be employed in any number of circumstances but it is particularly appropriate to, and beneficial within, situations, scenarios, etc. within a GUI where one or more of the following are present:

1) A user wishes to accomplish a task (e.g. create a new business object, enter a set of data, etc.) which consists of a series of steps, subtasks, etc.

2) A task is complex and may be decomposed into a series of steps, subtasks, etc.

3) A task is unfamiliar to the user.

4) A task's steps are dependent on each other. For example, a choice, selection, etc. that is made in a current step (e.g., Step N) affects, impacts, etc. some aspect of a next step (e.g., Step N+1).

The wizard facility described herein offers a number of innovative features, functions, capabilities, etc. including inter alia:

1) A consistent UI that is light in weight and thus may easily be used on any number of devices such as for example any combination of one or more of inter alia a wired device, a wireless device, a mobile phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), cable system or other set-top-box, an entertainment system component such as a television set, etc.

2) An easy to read progress indicator or bar that depicts possibly among other things the number of steps in a task, the current status, the steps that have been completed, the steps that need to be completed, etc.

3) The option to quickly and easily select, pick, etc. any step (to for example view, edit, etc. aspects of a previously completed step; to access a new step; etc.).

4) The ability to segment a task and then progressively expose to a user only a portion (e.g., the current elements) of the task to reduce complexity, to obviate overwhelming a user, etc.

5) The ability to include various optional steps, side fields, etc.

6) The flexible, extensible, and dynamically configurable identification of steps, the display/entry/etc. screens associated with a step, etc.

7) The ability to dynamically change, shrink, grow, etc. a task based on a user's entries, selections, etc. at each step.

8) The ability to dynamically adjust, change, etc. aspects of the different screens/displays/pages/etc. to account for inter alia device characteristics (such as size, orientation, etc.), device orientation, user actions, etc.

Figure 8:
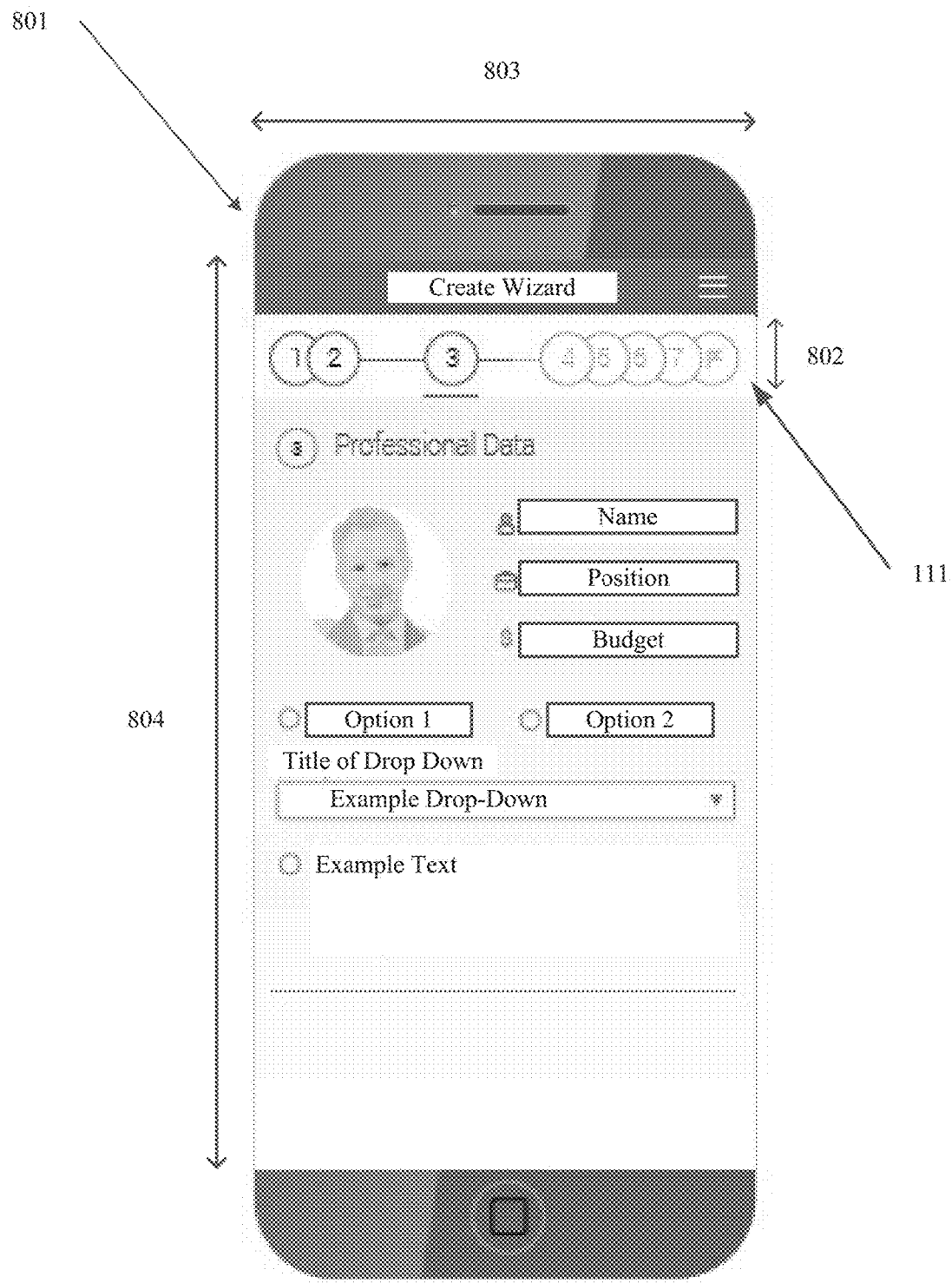
FIG. 8 depicts aspects of a wizard facility as described herein as it might appear on one particular device or platform—a smartphone

FIGS. 1 and 8 depict aspects of a wizard facility as described herein as it might appear on one particular device or platform—a smartphone.

FIG. 1 depicts aspects of a wizard facility as described herein as it might appear on one particular device or platform—a smartphone. Smartphone 101 may include display area 118. Within display area 118, an application header 110 may be displayed. Application header 110 may include, for example, the title of the application being created, i.e., "Create New Budget Report." Furthermore, display area 118 may include a responsive progress bar 111. In one particular embodiment, responsive progress bar 111 includes steps 1 to 7, which are visually represented in the progress bar. Progress bar may visually represent these steps as artifacts (i.e., shapes, icons, graphics, colors, sizes, etc.). Completed steps 1 and 2 may be positioned to one side of currently selected step 3 and may be visually represented as colored circles. Future steps 4 to 7 may be positioned to another side of currently selected step 3 and may be visually represented as shaded circles. Currently selected step 3 may be indicated by mark 102. Responsive progress bar 111 may also allow a user to select and/or navigate between steps 1 to 7.

Display area may display content area 113. Within content area 113, general content information related to the previous steps may be displayed to a user. For example, the name, department, and position of a particular employee may be displayed to a user. Other information may be displayed. Additionally, image 117 may be displayed in content area. The wizard facility may be configured in such a way that all information displayed in content area 113 is read-only with the possibility to edit. The possibility to edit may be available to a user via edit button 119.

Display area 118 may also include current step area 114. In current step area 114, editable fields 116 may be presented to the user in order for the user to complete any necessary fields required by the wizard facility. Furthermore, current step area 114 may also include button 115, which may be, for example, a button that allows the user to progress to the next step in the wizard facility. Button 15 may be configured in such a way that the button remains inactive until all required editable fields 116 have been filled by a user. In addition to these features, current step area 114 may also include edit button 119, which may allow a user to edit any information within the current step area 114.

Figure 2:
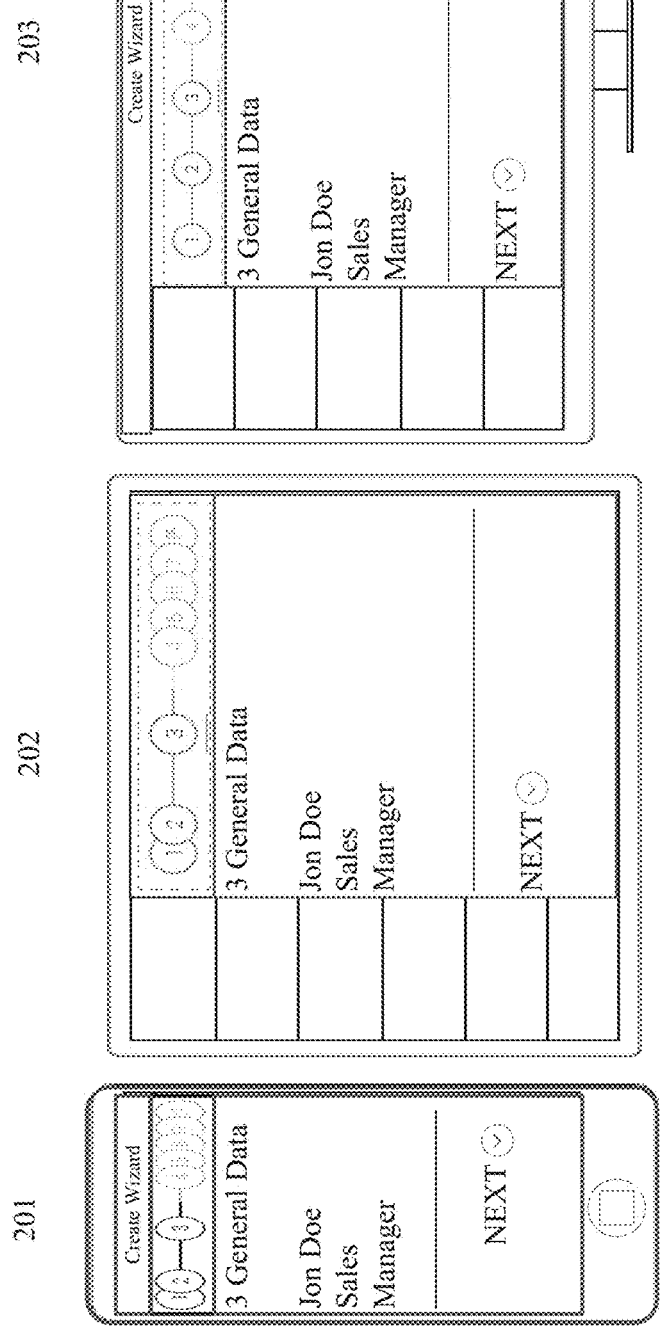
FIG. 2 depicts how aspects of a wizard facility as described herein might appear on three different devices or platforms.

FIG. 2 depicts how aspects of a wizard facility as described herein might appear on three different devices or platforms—a smartphone (mobile device) 201, a tablet 202, and a desktop computer 203. As illustrated in FIG. 2, the UI remains consistent throughout several different types of devices.

Figure 5:
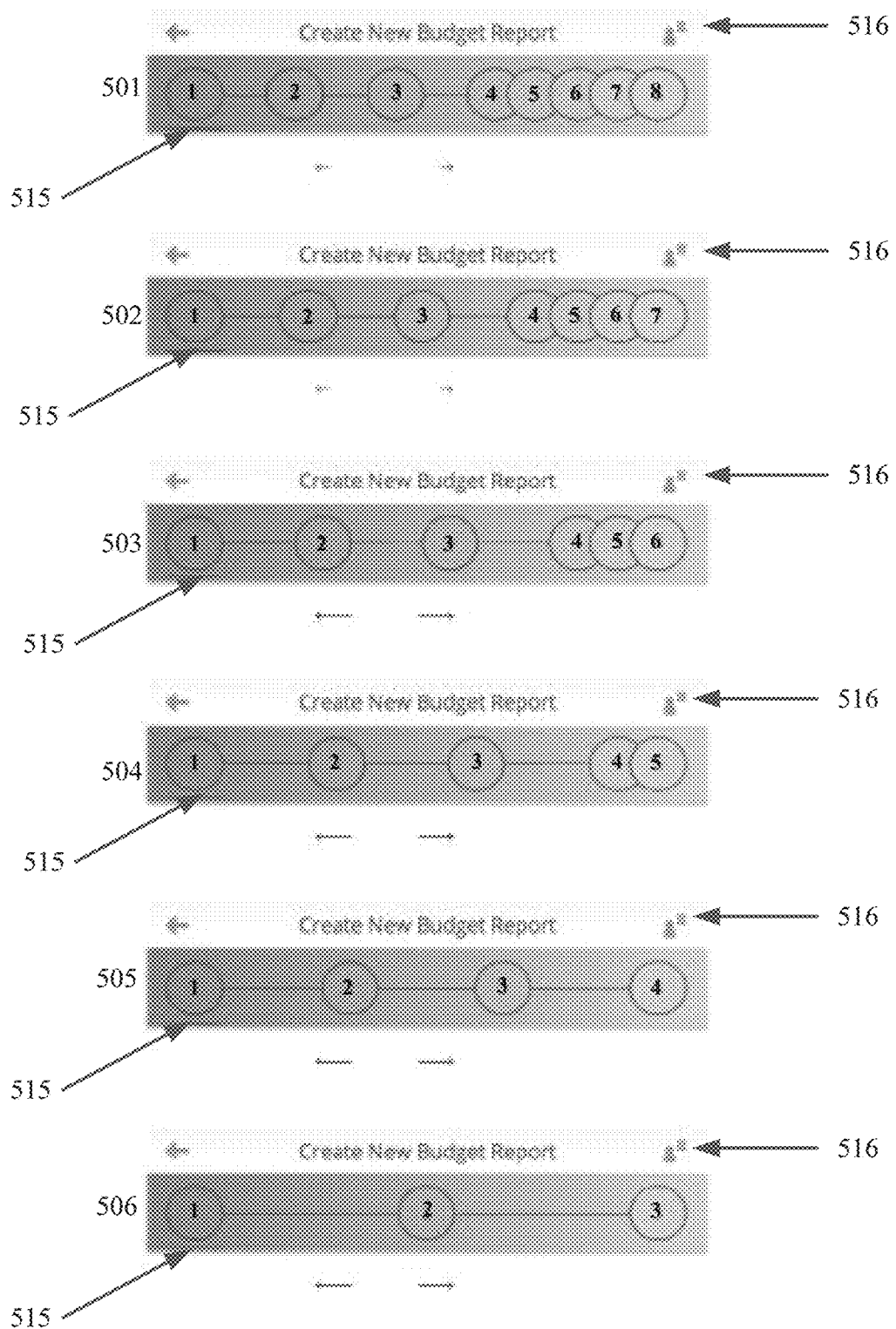
FIG. 5 depicts how aspects of a responsive progress indicator or bar might appear when a first element is selected.

FIGS. 3 to 8 depict aspects of how an easy to read, responsive progress indicator or bar may appear under different circumstances, settings, etc. FIGS. 3 and 5 illustrate how a progress bar may appear in circumstances when different amounts of space are available to display the progress bar. FIGS. 5 to 8 illustrate how such a bar may appear for a task with differing numbers of steps (from eight at the top to three at the bottom) when a first (for example, left-most) task is selected or active, when a middle task is selected or active, or when a last (for example, right-most) task is selected.

FIG. 3 depicts one embodiment of the progress bar. Progress bar 300 may display, inter alia, completed steps 1 and 2, currently selected step 3, and future steps 4 to 7. Progress bar may visually represent these steps as artifacts (i.e., shapes, icons, graphics, colors, sizes, etc.). Progress bar 300 may indicate that steps 1 and 2 are complete by positioning the steps to one side of currently selected step 3 and/or displaying steps 1 and 2 with solid, colored circles. Progress bar 300 may indicate the currently selected step with mark 301. Additionally, progress bar 300 may indicate steps 4 to 7 are future steps by positioning the steps to a second side of currently selected step 3 and/or displaying future steps 4 to 7 with shaded/dashed lines. Step 302 may indicate to a user the last step in the wizard facility. Step 302 may include an image related to completion of the wizard facility. Furthermore, the position of completed steps 1 to 2 and future steps 4 to 7 relative to neighboring steps may vary depending on the size of progress bar 300. That is, if progress bar 300 is relatively small, completed steps 1 to 2 may be spaced relatively close to each other (i.e., step 1 is spaced relatively close to step 2). Furthermore, future steps 4 to 7 may be spaced relatively close to each other (i.e., step 4 is spaced relatively close to step 5, etc.). Additionally, the images representing the steps may be altered depending on the position of neighboring steps. That is, visual representation of steps 1 and 2 that are spaced relatively close to each other may be represented, for example, by truncated circles.

FIG. 4 depicts progress bar 400. Progress bar 400 may display, inter alia, completed steps 1 and 2, currently selected step 3, and future steps 4 to 7. Progress bar may visually represent these steps as artifacts (i.e., shapes, icons, graphics, colors, sizes, etc.). Progress bar 400 may indicate that steps 1 and 2 are complete by positioning the steps to one side of currently selected step 3 and/or displaying steps 1 and 2 with colored circles. Progress bar 400 may indicate the currently selected step with mark 401. Additionally, progress bar 400 may indicate future steps 4 to 7 by positioning the steps to a second side of currently selected step 4 and/or displaying future steps 4 to 7 with shaded/dashed lines. Step 402 may indicate to a user the last step in the wizard facility. Step 402 may include an image related to completion of the wizard facility. Similar to FIG. 3, the position of completed steps 1 to 2 and future steps 4 to 7 relative to neighboring steps may vary depending on the size of progress bar 400. For example, progress bar 300 in FIG. 3 is relatively small compared to progress bar 400 in FIG. 4. Accordingly, progress bar 400 may display completed steps 1 to 2 relatively far from each other (i.e., step 1 is spaced relatively far from step 2). Furthermore, future steps 4 to 7 may be spaced relatively far from each other (i.e., step 4 is spaced relatively far from step 5). Additionally, the visual representations of the steps may be, for example, full circles.

As can be understood by FIG. 3 and FIG. 4, the wizard facility may automatically adjust the characteristics of the progress bar based available space in which to display the progress bar. That is, the progress bars described herein may have the ability to dynamically, adjust, change, etc. aspects of the different screens/displays/pages/etc. to account for inter alia device characteristics (such as size, orientation, etc.), device orientation, user actions, etc. In particularly, FIG. 4 illustrates a progress bar that is larger (i.e., more space is available, i.e., a computer monitor) than the progress bar illustrated in FIG. 3 (i.e., less space is available, for example, a smart phone).

FIGS. 5 to 8 illustrate progress bars that have similar available space in which to display the progress bar, but have different currently selected steps. Progress bars in FIGs to 8 may visually represent their respective steps as artifacts (i.e., shapes, icons, graphics, colors, sizes, etc.). FIG. 5 depicts how aspects of a responsive progress indicator or bar might appear when a first step is selected. Additionally, progress bars 501 to 506, each with a different number of steps: progress bar 501 has 8 steps, progress bar 502 has 7 steps, progress bar 503 has 6 steps, progress bar 504 has 5 steps, progress bar 505 has 4 steps, and progress bar 506 has 3 steps. In each progress bar 501 to 506, the currently selected step may be indicated to a user by mark 515. Progress bars 501 to 506 may also include application header 516. As can be understood from FIG. 5, depending on the total number of steps in a particular progress bar, the location and/or size of the visual representation of a step may be varied. For example, progress bar 501 includes 8 steps, thus the size and location of each step (1, 2, 3, 4, etc.) are positioned closer relative to neighboring steps (i.e., step 1 is positioned relatively close to step 2). Additionally, the visual representations of each step may be varied (i.e., steps 1 and 2 have truncated circles). In contrast, in progress bar 506, which only includes 3 steps, the size and location of each step may be positioned relatively farther away from each other and/or equally spaced (i.e., step 1 is positioned relatively far away from step 2 and all three steps are equally spaced), and the visual representation of the steps is a full circle. Furthermore, the visual representation of the steps may be varied depending on the proximity to the currently selected step and/or the total number of steps displayed in the progress bar. For example, in progress bar 501, the currently selected step is 1. Accordingly, steps 2 and 3 are positioned relatively far from each other, as compared to steps 4 to 8, which are spaced relatively close to each other.

Figure 6:
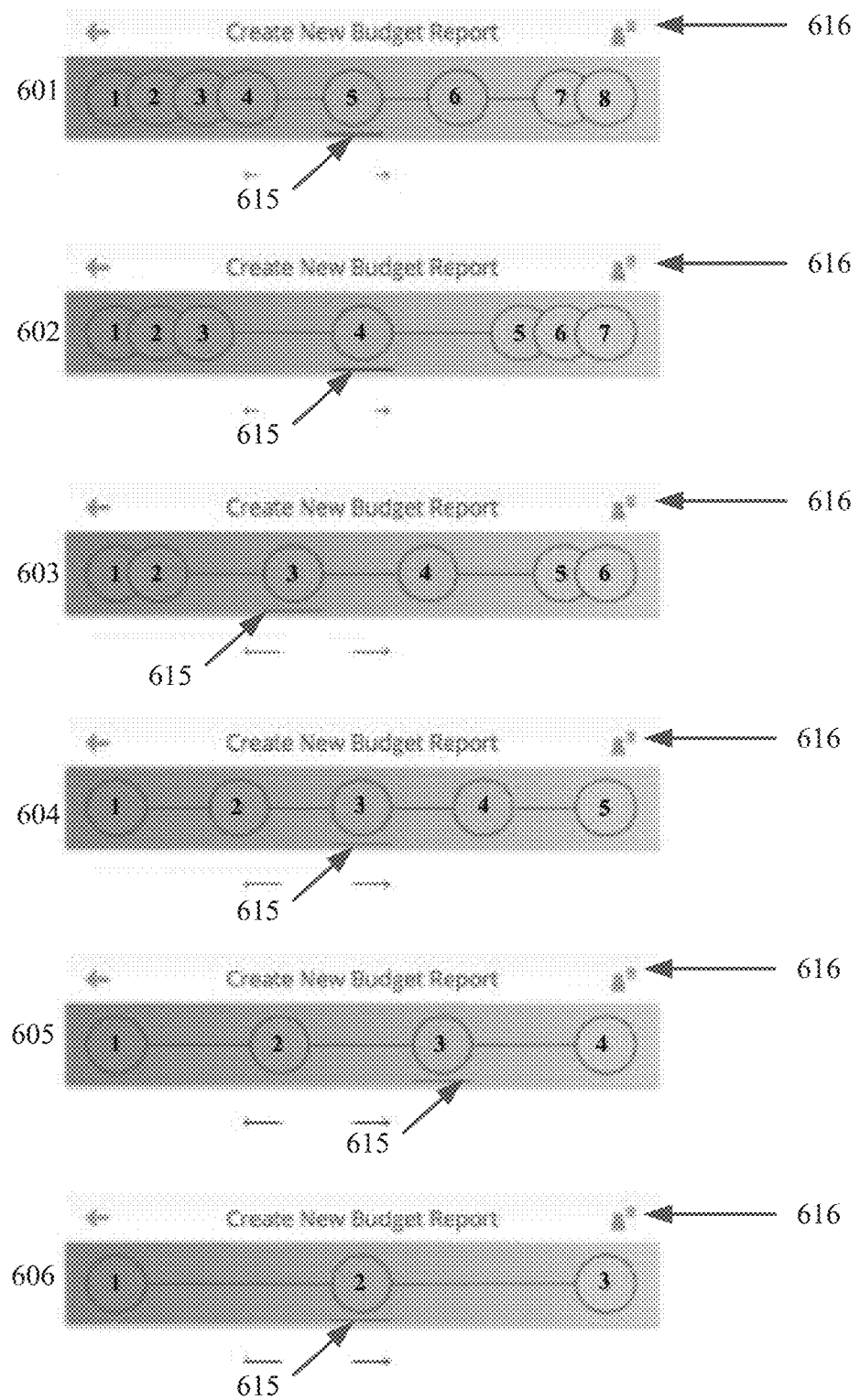
FIG. 6 depicts how aspects of a responsive progress indicator or bar might appear when a middle element is selected.

FIG. 6 illustrates similar features as that of FIG. 5, but instead of step 1 being the currently selected step, FIG. 6 illustrates progress bars 601 to 606 in which a middle step is the currently selected step: in progress bar 601, step 5 is currently selected; in progress bar 602, step 4 is currently selected, in progress bars 603 to 605, step 3 is currently selected; and in progress bar 606, step 2 is currently selected. FIG. 6 also depicts progress bars 601 to 606, each with a different number of steps: progress bar 601 has 8 steps, progress bar 602 has 7 steps, progress bar 603 has 6 steps, progress bar 604 has 5 steps, progress bar 605 has 4 steps, and progress bar 606 has 3 steps. In each progress bar 601 to 606, the currently selected step may be indicated by mark 615. Progress bars 601 to 606 may also include application header 616. As can be understood from FIG. 6, depending on the total number of steps in a particular progress bar, the location and/or size of the visual representation of a step may be varied. Furthermore, the visual representations of each step may be varied depending on the proximity to the currently selected step and/or the total number of steps displayed in the progress bar. For example, in progress bar 601, currently selected step is 5 and the total number of steps is 8. Accordingly, steps 1 to 4 are positioned relatively close to each other, step 6 is positioned relatively far from step 5 and step 7, and steps 7 and 8 are positioned relatively close to each other.

Figure 7:
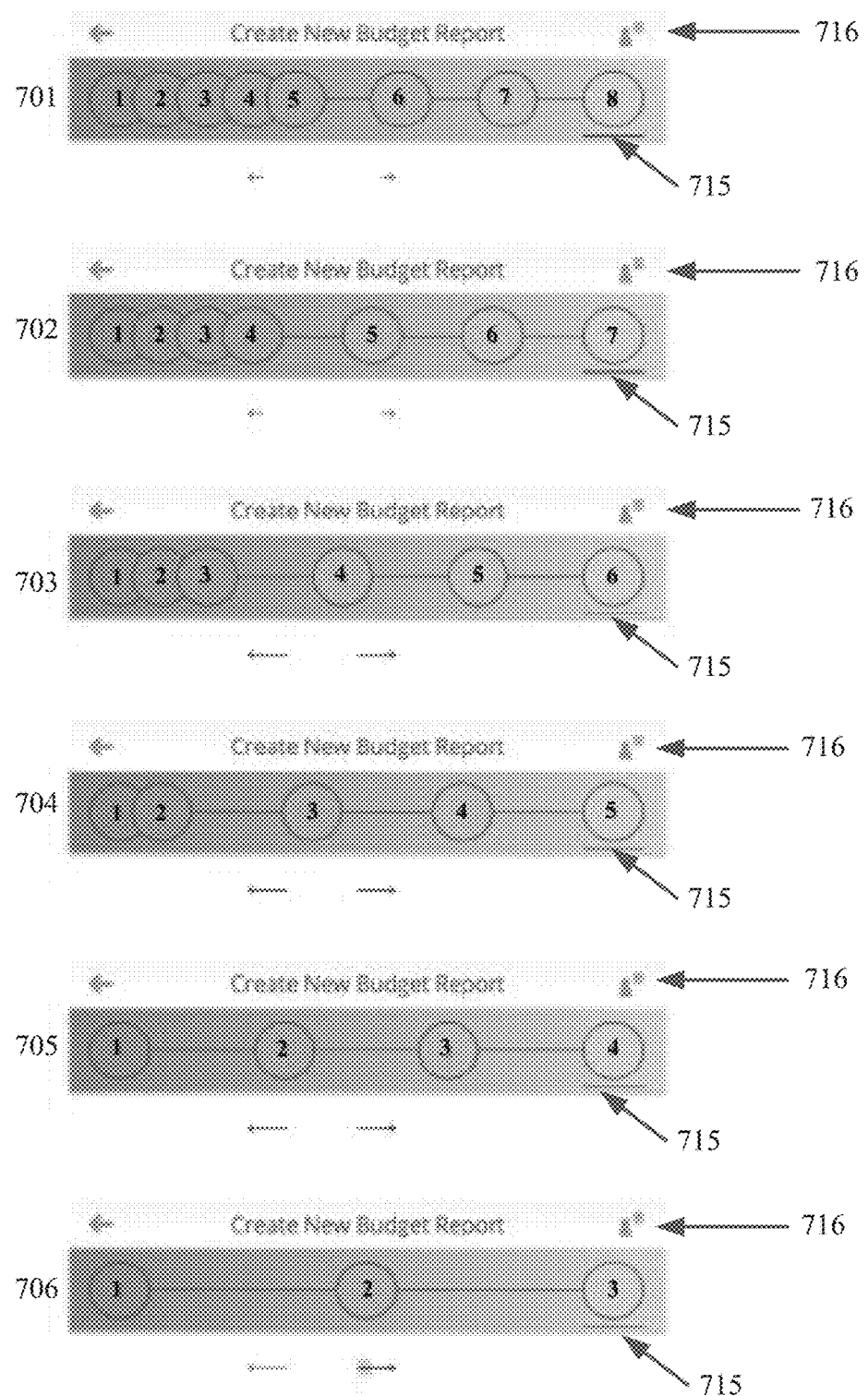
FIG. 7 depicts how aspects of a responsive progress indicator or bar might appear when a last element is selected.

FIG. 7 illustrates similar features as that of FIG. 5 and FIG. 6. FIG. 7 illustrates progress bars 701 to 706 in which the last step is currently selected. In progress bar in progress 701, step 8 is currently selected; in progress 702, step 7 is currently selected; in progress 703, step 6 is currently selected; in progress 704, step 5 is currently selected; in progress 705, step 4 is currently selected; and in progress bar 706, step 3 is currently selected. FIG. 7 also depicts progress bars 701 to 706, each with a different number of steps: progress bar 701 has 8 steps, progress bar 702 has 7 steps, progress bar 703 has 6 steps, progress bar 704 has 5 steps, progress bar 705 has 4 steps, and progress bar 706 has 3 steps. Currently selected step may be indicated by mark 715. Progress bars 701 to 706 may also include application header 716. As can be understood from FIG. 7, depending on the total number of steps in a particular progress bar, the location and/or size of the visual representation of a step may be varied.

FIG. 8 depicts aspects of a wizard facility as described as it might appear on a smart phone. Smartphone 801 includes a display area that has a height of 804 and a width of 803. Moreover, smartphone 801 includes a defined progress bar height 802 for progress bar 111. In this manner, progress bar height 802 is selected to ensure that a user is able to interact with the progress bar effectively.

It is important to note that the particulars of FIGS. 1 through 8 (such as for example the specific elements that are presented, the element arrangement that is depicted, etc.) are illustrative only and it will be readily apparent to one of ordinary skill in the relevant art that numerous alternatives (including inter alia other or different elements, alternative element arrangements, etc.) are easily possible.

The various figures depict one possible orientation (such as for example portrait or landscape) on a device or platform (such as for example a smartphone (mobile device), a tablet, a desktop computer, etc.) but it will be readily apparent to one of ordinary skill in the relevant art that numerous alternative orientations are easily possible.

The various figures depiction one possible progress indicator or bar arrangement (e.g., location on a display, organization, etc.) but it will be readily apparent to one of ordinary skill in the relevant art that numerous alternatives are easily possible. For example and inter alia:

1) Such a bar may be positioned, located, etc. on any portion of a display (such as for example top, middle, bottom, left, right, etc.).

2) Such a bar may be oriented in any direction (such as for example vertical, horizontal, diagonally, etc.)

3) Such a bar may operate in any direction (such as for example left, right, etc.).

4) Any number of artifacts (such as for example shapes, icons, graphics, colors, sizes, etc.) may be used to identify each individual step in a task, the steps that have been completed, the current step, the steps that are yet to be completed, etc. For example, the size of an artifact may be varied to indicate to the user the 'size' of a step; coloring/shading/etc. may be employed to indicate the percentage of a step that has been completed, etc.; any combination of numbers, letters, symbols, etc. may be used to identify one or more of the steps in a task; any combination of numbers, letters, symbols, etc. may be used to identify special steps in a task (such as for example a first step, a last step, etc.); any number of different schemes, codings, etc. may be used to identify the nature of a step (such as for example optional, critical, etc.); any number of schemes, codings, etc. may be used to group, associate, etc. different sets of steps; etc.

5) The state, condition, etc. of different ones of the artifacts (see #4 above)—for example display, selectable, locked, highlighted, etc.—may be dynamically changed based on any number of parameters including for example configuration/definition/etc. information, user action(s), current state, etc.

In a wizard as described herein the presentation of the display/entry/etc. screens associated with a step in a task may take any number of forms (including for example any combination of one or more of inter alia individual, stacked, overlapped, layered, tabbed, card deck, etc.) in support of among other things efficient presentation (particularly on devices with limited, constrained, etc. display real estate), to allow a user to easily and quickly scroll, walk, etc. through same with for example the progress indicator or bar dynamically changing to reflect such action, etc.

In a wizard as described herein the different display/entry/etc. screens, along with the different objects (such as descriptive information, display/entry/selection/etc. devices, etc.) that may reside on same, that are associated with a step in a task may among other things be dynamically sized, adjusted, etc. to account for inter alia device characteristics (such as for example size, available display real estate, etc.), device orientation (such as for example portrait, landscape, etc.), user actions, etc.

In a wizard as described herein a user may interact through any number of means including for example a mouse, a keyboard, voice, gestures, etc. to among other things select or otherwise navigate to a step, review information, enter data, make selections, etc.

A wizard as described herein may offer a range of descriptive, visual, audio, etc. assistance (such as for example help, (task-specific, field-specific, etc.) tips, etc.) to aid a user as she iterates through a task.

A wizard as described herein may optionally present, offer, etc. any number of associative items including inter alia branding, logos, advertising, etc.

A wizard as described herein may employ, leverage, utilize, etc. a range of configuration, definition, etc. information in support of inter alia the identification of a task; the identification of each step in a task; the association of screens, displays, pages, etc. to a task; the identification of (task-wide, step-specific, screen/display/page/etc.-specific, display/entry/selection/etc. device-specific, etc.) actions that are to be performed or carried out; etc.

A wizard as described herein may reside in any type of application including for example any combination of one or more of inter alia web-based applications (incorporating for example HTML5, Cascading Style Sheets (CSS), JavaScript, etc.), hybrid applications (incorporating for example containerization, etc.), native applications, Rich Internet Applications (RIAs), Rich User Applications (RUAs), etc.

A wizard as described herein may employ, leverage, etc. inter alia an associated set of user access credentials (such as for example an identifier and a password), assigned permissions, defined access rights, defined data visibility scope, etc.

A wizard as described herein may operate solely on a device (such as a smartphone, a tablet, a desktop computer, etc.) or may leverage, and thus exchange interactions with, a back-end system (such as a server, etc.).

Various of the interactions that were described above may optionally leverage, reference, etc. information on the current physical location of a user's device as obtained through inter alia a one or more of a Location-Based Service (LBS) facility, a Global Positioning System (GPS) facility, etc. to among other things enhance security, provide more applicable or appropriate information, etc.

Various of the interactions that were described above comprise, leverage, employ, etc. any combination of one or more of inter alia a (SMS, MMS, IMS, etc.) message exchange, a WAP exchange, a structured or an unstructured data transfer, a data transfer operation atop one or more standards-based protocols (such as for example TCP/IP) and/or proprietary protocols, an E-Mail exchange, an IM exchange, Wi-Fi, a NFC exchange, etc.

The various interactions that were described above are illustrative only and it will be readily apparent to one of ordinary skill in the relevant art that numerous other interactions are easily possible.

Aspects of the above can be implemented through any combination of one or more of software, firmware, and/or hardware.

Figure 9:
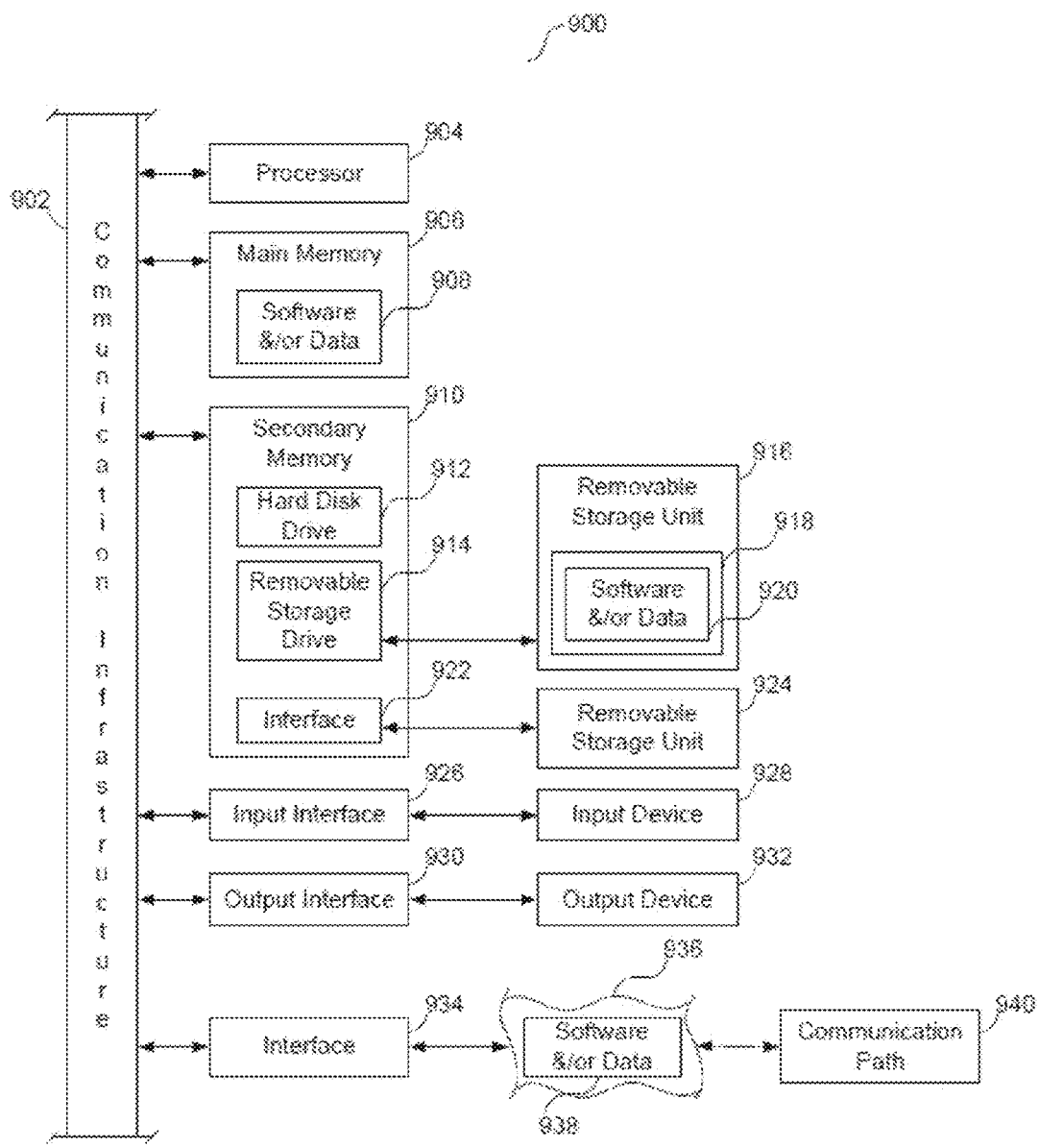
FIG. 9 depicts an example block diagram of a computing device capable of operations that realize aspects of the wizard facility as described herein.

FIG. 9 illustrates an example computer system 900 in which the above, or portions thereof, may be implemented as computer-readable code. Various embodiments of the above are described in terms of this example computer system 900. After reading this description, it will become apparent to a person skilled in the relevant art how to implement the embodiments described herein using other computer systems and/or computer architectures.

Computer system 900 includes one or more processors, such as processor 904. Processor 904 can be a special purpose processor or a general purpose processor. Processor 904 is connected to a communication infrastructure 902 (for example, a bus or a network).

Computer system 900 also includes a main memory 906, preferably Random Access Memory (RAM), containing possibly inter alia computer software and/or data 908.

Computer system 900 may also include a secondary memory 910. Secondary memory 910 may include, for example, a hard disk drive 912, a removable storage drive 914, a memory stick, etc. A removable storage drive 914 may comprise a floppy disk drive, a magnetic tape drive, an optical disk drive, a flash memory, or the like. A removable storage drive 914 reads from and/or writes to a removable storage unit 916 in a well-known manner. A removable storage unit 916 may comprise a floppy disk, magnetic tape, optical disk, etc. which is read by and written to by removable storage drive 914. As will be appreciated by persons skilled in the relevant art(s) removable storage unit 916 includes a computer usable storage medium 918 having stored therein possibly inter alia computer software and/or data 920.

In alternative implementations, secondary memory 910 may include other similar means for allowing computer programs or other instructions to be loaded into computer system 1400. Such means may include, for example, a removable storage unit 924 and an interface 922. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 924 and interfaces 922 which allow software and data to be transferred from the removable storage unit 924 to computer system 900.

Computer system 900 may also include an input interface 926 and a range of input devices 928 such as, possibly inter alia, a keyboard, a mouse, etc.

Computer system 900 may also include an output interface 930 and a range of output devices 932 such as, possibly inter alia, a display, one or more speakers, etc.

Computer system 900 may also include a communications interface 934. Communications interface 934 allows software and/or data 938 to be transferred between computer system 900 and external devices. Communications interface 934 may include a modem, a network interface (such as an Ethernet card), a communications port, a Personal Computer Memory Card International Association (PCMCIA) slot and card, or the like. Software and/or data 938 transferred via communications interface 934 are in the form of signals 936 which may be electronic, electromagnetic, optical, or other signals capable of being received by communications interface 934. These signals 936 are provided to communications interface 934 via a communications path 940. Communications path 940 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 916, removable storage unit 924, and a hard disk installed in hard disk drive 912. Signals carried over communications path 940 can also embody the logic described herein. Computer program medium and computer usable medium can also refer to memories, such as main memory 906 and secondary memory 910, which can be memory semiconductors (e.g. Dynamic Random Access Memory (DRAM) elements, etc.). These computer program products are means for providing software to computer system 900.

Computer programs (also called computer control logic) are stored in main memory 906 and/or secondary memory 910. Computer programs may also be received via communications interface 934. Such computer programs, when executed, enable computer system 900 to implement aspects of the disclosure as discussed herein. In particular, the computer programs, when executed, enable processor 904 to implement the processes of aspects of the above. Accordingly, such computer programs represent controllers of the computer system 900. Where aspects of the instant disclosure are implemented using software, the software may be stored in a computer program product and loaded into computer system 900 using removable storage drive 914, interface 922, hard drive 912 or communications interface 934.

The instant disclosure is also directed to computer program products comprising software stored on any computer useable medium. Such software, when executed in one or more data processing devices, causes data processing device (s) to operate as described herein. Embodiments of the instant disclosure employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nano-technological storage device, etc.), and communication mediums (e.g., wired and wireless communications networks, local area networks, wide area networks, intranets, etc.).

Based on the teachings contained in this disclosure, it will be apparent to persons skilled in the relevant art(s) how to make and use aspects of the instant disclosure using means other than that shown in FIG. 9. In particular, embodiments may operate with software, hardware, and/or operating system implementations other than those described herein.

The above description is intended by way of example only. It will be readily apparent to one of ordinary skill in the relevant art that various modifications and structural changes may be made therein without departing from the scope of the concepts described herein and within the scope and range of equivalents of the claims.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

What is claimed is:

1. A computer-implemented method executed by a computing device having a display device, the display device having a particular screen size, the method comprising:
    displaying, by the computing device, a first area on the display device, wherein the first area displays general information related to a task;
    determining, by the computing device, a progress bar for display on the display device, wherein the progress bar includes a series of graphical elements corresponding to steps related to the task, wherein an obstruction of the graphical elements and a spacing between the graphical elements corresponding to the steps are determined based on the particular screen size;
    adjusting the obstruction and spacing between the series of graphical elements based on the particular screen size, wherein on a first screen size at least a first one of the graphical elements obstructs a second one of the graphical elements, and wherein on a second screen size the first graphical element obstructs the second graphical element to a lesser extent;
    displaying, by the computing device, the progress bar on the display device in accordance with one of the first screen size or the second screen size as corresponding to the particular screen size, and wherein the progress bar displays at least: i) at least one completed step, ii) a currently selected step, and iii) at least one future step, and wherein the progress bar includes at least one option to navigate to at least one of the at least one completed step and the at least one future step;
    displaying, by the computing device, a second area on the display device, wherein the second area displays content related to the at least one completed step, wherein the second area includes an option to modify the content related to the at least one completed step; and
    displaying, by the computing device, a third area on the display device, wherein the third area displays content related to the currently selected step, and wherein the third area includes an option to navigate to the at least one future step.

2. The method of claim 1, wherein the progress bar displays the at least one completed step on a first side of the currently selected step and displays the at least one future step on a second side of the currently selected step.

3. The method of claim 1, wherein at least one of a shape, a size, and a position of the first, second, and third artifacts is varied based on the size of the progress bar.

4. The method of claim 1, wherein at least one of a shape, a size, and a position of the first, second, and third artifacts is varied based on a sum of the at least one completed step, currently selected step, and the at least one future step.

5. The method of claim 1, wherein the first area, the progress bar, the second area, and the third area automatically adjusts according to a space that is available to display the first area, the progress bar, the second area, and the third area.

6. The method of claim 1, wherein a relative positioning between the graphical elements of the progress bar when displayed on a mobile device varies from a relative positioning of the graphical elements of the progress bar when displayed on a tablet computer.

7. The method of claim 1, wherein at least one of the shape, size, and position of the first, second, and third artifacts is based on which step is currently selected.

8. An apparatus, comprising:
a computer device including a display device configured to:
display a first area, wherein the first area displays general information related to a task;
determine, by the computer device, a progress bar for display on the display device, wherein the progress bar includes a series of graphical elements corresponding to steps related to the task, wherein an obstruction of the graphical elements and a spacing between the graphical elements corresponding to the steps are determined based on the particular screen size;
adjust, by the computing device, the obstruction and spacing between the series of graphical elements based on the particular screen size, wherein on a first screen size at least a first one of the graphical elements obstructs a second one of the graphical elements, and wherein on a second screen size the first graphical element obstructs the second graphical element to a lesser extent;
display, by the computing device, the progress bar on the display device in accordance with one of the first screen size or the second screen size as corresponding to the particular screen size, and wherein the progress bar displays at least: i) at least one completed step, ii) a currently selected step, and iii) at least one future step, and wherein the progress bar includes at least one option to navigate to at least one of the at least one completed step and the at least one future step;
display, by the computer device, a second area on the display device, wherein the second area displays content related to the at least one completed step, wherein the second area includes an option to modify the content related to the at least one completed step; and
display, by the computer device, a third area on the display device, wherein the third area displays content related to the currently selected step, and wherein the third area includes an option to progress to the at least one future step.

9. The apparatus of claim 8, wherein the at least one completed step is visually represented by a first artifact, the currently selected step is visually represented by a second artifact, and the at least one future step is visually represented by a third artifact.

10. The apparatus of claim 8, wherein at least one of a shape, a size, and a position of the first, second, and third artifacts is varied based on the size of the progress bar.

11. The apparatus of claim 8, wherein at least one of a shape, a size, and a position of the first, second, and third artifacts is varied based on a sum of the at least one completed step, currently selected step, and the at least one future step.

12. The apparatus of claim 8, wherein the first area, the progress bar, the second area, and the third area automatically adjusts according to a space that is available to display the first area, the progress bar, the second area, and the third area.

13. The apparatus of claim 8, wherein at least one of the shape, size, and position of the first, second, and third artifacts is based on which step is currently selected.

14. A non-transitory computer-readable medium storing program instructions that, when executed, cause a processor to perform a method to guide a user through a series of steps related to a task the method comprising:
displaying, by a computing device, a first area on a display device, wherein the first area displays general information related to a task;
determining, by the computing device, a progress bar for display on the display device, wherein the progress bar includes a series of graphical elements corresponding to steps related to the task, wherein an obstruction of the graphical elements and a spacing between the graphical elements corresponding to the steps are determined based on the particular screen size;
adjusting the obstruction and spacing between the series of graphical elements based on the particular screen size, wherein on a first screen size at least a first one of the graphical elements obstructs a second one of the graphical elements, and wherein on a second screen size the first graphical element obstructs the second graphical element to a lesser extent;
displaying, by the computing device, the progress bar on the display device in accordance with one of the first screen size or the second screen size as corresponding to the particular screen size, and wherein the progress bar displays at least: i) at least one completed step, ii) a currently selected step, and iii) at least one future step, and wherein the progress bar includes at least one option to navigate to at least one of the at least one completed step and the at least one future step;
displaying, by the computing device, a second area on the display device, wherein the second area displays content related to the at least one completed step, wherein the second area includes an option to modify the content related to the at least one completed step; and
displaying, by the computing device, a third area on the display device, wherein the third area displays content related to the currently selected step, and wherein the third area includes an option to progress to the at least one future step.

15. The non-transitory computer readable medium of claim 14, wherein the at least one completed step is visually represented by a first artifact, the currently selected step is visually represented by a second artifact, and the at least one future step is visually represented by a third artifact.

16. The non-transitory computer readable medium of claim 15, wherein at least one of a shape, a size, and a position of the first, second, and third artifacts is varied based on at least one of the following: i) the size of the progress bar, ii) a sum of the at least one complete step, currently selected step, and the at least one future step, and iii) the currently selected step.

17. The non-transitory computer readable medium of claim 15, wherein the progress bar is displayed on a mobile device, wherein the mobile device includes a touchscreen, and wherein the size of the progress bar is based on a user's interaction with the mobile device.

18. The method of claim 6, wherein a first graphical element corresponding to a step on the mobile device may include a truncated version of a second graphical element of the step on the tablet.

19. The method of claim 1, further comprising:
determining a change in an orientation of a rectangular screen of the computing device; and
wherein the adjusting comprises increasing the obstruction of a first one of the graphical elements of the progress bar based on the change in the orientation, wherein a visibility of the first graphical element is more greatly obstructed by a second one of the graphical elements after the change in the orientation, relative to the obstruction of the first graphical element prior to the change in orientation.

20. The method of claim 1, wherein the first graphical element does not obstruct the second graphical element on the second screen size.

\* \* \* \* \*